United States Patent
Wood et al.

(10) Patent No.: US 9,104,743 B1
(45) Date of Patent: * Aug. 11, 2015

(54) SYSTEM AND METHOD FOR FILE DIFFERENCING WITH IMPORTANCE RANKING

(71) Applicant: The MathWorks, Inc., Natick, MA (US)

(72) Inventors: Malcolm A. Wood, Edinburgh (GB); Gavin W. Walker, Cambridge (GB)

(73) Assignee: The Mathworks, Inc., Natick, MA (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/768,854

(22) Filed: Feb. 15, 2013

Related U.S. Application Data

(63) Continuation of application No. 12/830,844, filed on Jul. 6, 2010, now Pat. No. 8,386,504.

(51) Int. Cl.
*G06F 17/30* (2006.01)
(52) U.S. Cl.
CPC ................. *G06F 17/30595* (2013.01)
(58) Field of Classification Search
CPC ................................................ G06F 17/30356
USPC ........................................................ 707/758
See application file for complete search history.

(56) References Cited

U.S. PATENT DOCUMENTS

| | | | |
|---|---|---|---|
| 7,120,572 B1 | 10/2006 | Liang | |
| 7,506,330 B2 | 3/2009 | Alexander, III et al. | |
| 7,571,431 B2 | 8/2009 | Hampapuram et al. | |
| 7,797,673 B2 | 9/2010 | Szpak | |
| 8,001,083 B1 | 8/2011 | Offer | |
| 2003/0135476 A1 | 7/2003 | Holland et al. | |
| 2003/0188303 A1 | 10/2003 | Barman et al. | |
| 2005/0204298 A1 | 9/2005 | Kemp | |
| 2005/0216894 A1 | 9/2005 | Igarashi | |
| 2006/0143243 A1 | 6/2006 | Polo-Malouvier et al. | |
| 2006/0184928 A1* | 8/2006 | Hughes | 717/168 |
| 2011/0197121 A1 | 8/2011 | Kletter | |

(Continued)

FOREIGN PATENT DOCUMENTS

WO    WO-2009/095741 A1    8/2009

OTHER PUBLICATIONS

"ecDIFF™ for Simulink®: Graphical Differencing Environment for Simulink® Models," ExpertControl GmbH, Mar. 25, 2008, pp. 1-2.

(Continued)

*Primary Examiner* — Etienne Leroux
*Assistant Examiner* — Cindy Nguyen
(74) *Attorney, Agent, or Firm* — Cesari and McKenna, LLP

(57) ABSTRACT

A system and method determines the differences between versions of an object, such as a file. The object versions are compared using a differencing tool to identify the differences between the versions. A scoring algorithm may be selected for the object based on one or more attributes of the object. The scoring algorithm is used to compute a difference score for the object. The difference score may be a function of the differences between the object versions and the characteristics or qualities of those differences. The difference score provides an indication of the relative importance of the changes made to the object. The difference scores from multiple objects may be presented in an interactive report, and sorted to identify those objects that underwent the most significant or noteworthy changes.

21 Claims, 9 Drawing Sheets

(56) References Cited

U.S. PATENT DOCUMENTS

2011/0197276 A1* 8/2011 Dorrendorf et al. ............ 726/22
2012/0159453 A1   6/2012 Zhao

OTHER PUBLICATIONS

"PC-lint/FlexeLint," Reference Manual, Software Version 8.00 and later, Document Version 8.00, Gimpel Software Jul. 2001, pp. 1-367.
Leppänen, Ville, "On Programming Style Checkers," Seminar on SE, Spring 2005, pp. 1-24.
"Cppcheck 1.55," Jun. 2012, pp. 1-20.
Worth, D.J., et al., "A Survey of C and C++ Software Tools for Computational Science," Science and Technologies Facilities Council, Dec. 2009, pp. 1-38.
"PolySpace® Products for C 7: Reference," The MathWorks, Inc., Mar. 2009, pp. i-vi, 1-1 to 1-66, 2-1 to 2-50, 3-1 to 3-10, and 4-1 to 4-4.
"PolySpace® Products for C 7: Getting Started Guide," The MathWorks, Inc., Mar. 2009, pp. i-viii, 1-1 to 1-12, 2-1 to 2-16, 3-1 to 3-28, 4-1 to 4-40, 5-1 to 5-16, 6-1 to 6-14, and Index-1 to Index-4.
"BridgeVIEW™ and LabVIEW™: Professional G Developers Tools Reference Manual," National Instruments Corporation, May 1998, pp. 1-176.
"MATLAB® 7: Desktop Tools and Development Environment," The MAthWorks, Inc., Mar. 2010, all pages, pp. 1-1046, see especially pp. 7-59 to 7-62.

* cited by examiner

| | 402 | 404 | Prior Version (Contents of folder C:\Work\comp\curvefitting) 414 406 | | Current Version (Contents of folder C:\Work\comp\curvefitting2) 416 408 400 420 | | 410 | 412 |
|---|---|---|---|---|---|---|---|---|
| | Type | Object Name | Size (bytes) | Last Modified | Size (bytes) | Last Modified | Change Summary | Difference Score |
| 422a — | ASV | lengthofline.asv (open) | (not in this list) | | 2403 | 2009-11-16 | added | 1 |
| 422b — | HTML | manifest_report.html (open) | 2410 | 2008-11-27 | (not in this list) | | removed | 1 |
| 422c — | MAT | splinetool.mat (open) | 1720 | 2008-08-20 | | | removed | 5 |
| 422d — | M | csapidem.m (open) | (not in this list) | | 15038 | 2009-01-08 | added | 6.25 |
| 422e — | M | lengthofline.m (open: left right) | 2405 | 2009-11-12 | 2408 | 2009-11-16 | contents changed (compare) 426 | 7 |
| 422f — | TXT | kdm.txt (open) | (not in this list) | | 1367 | 2008-10-03 | added | 4 |
| 422g — | XML | report.xml (open) | (not in this list) | | 4868 | 2008-09-11 | added | 1 |
| 422h — | folder | curvefit | - | 2009-11-16 | - | 2009-11-17 | contents changed (compare) | - |
| 422i — | folder | cftoolgui | - | 2009-11-16 | - | 2009-11-17 | contents changed (compare) | - |
| 422j — | folder | demosearch | - | 2009-11-16 | - | 2009-11-16 | identical | 0 |

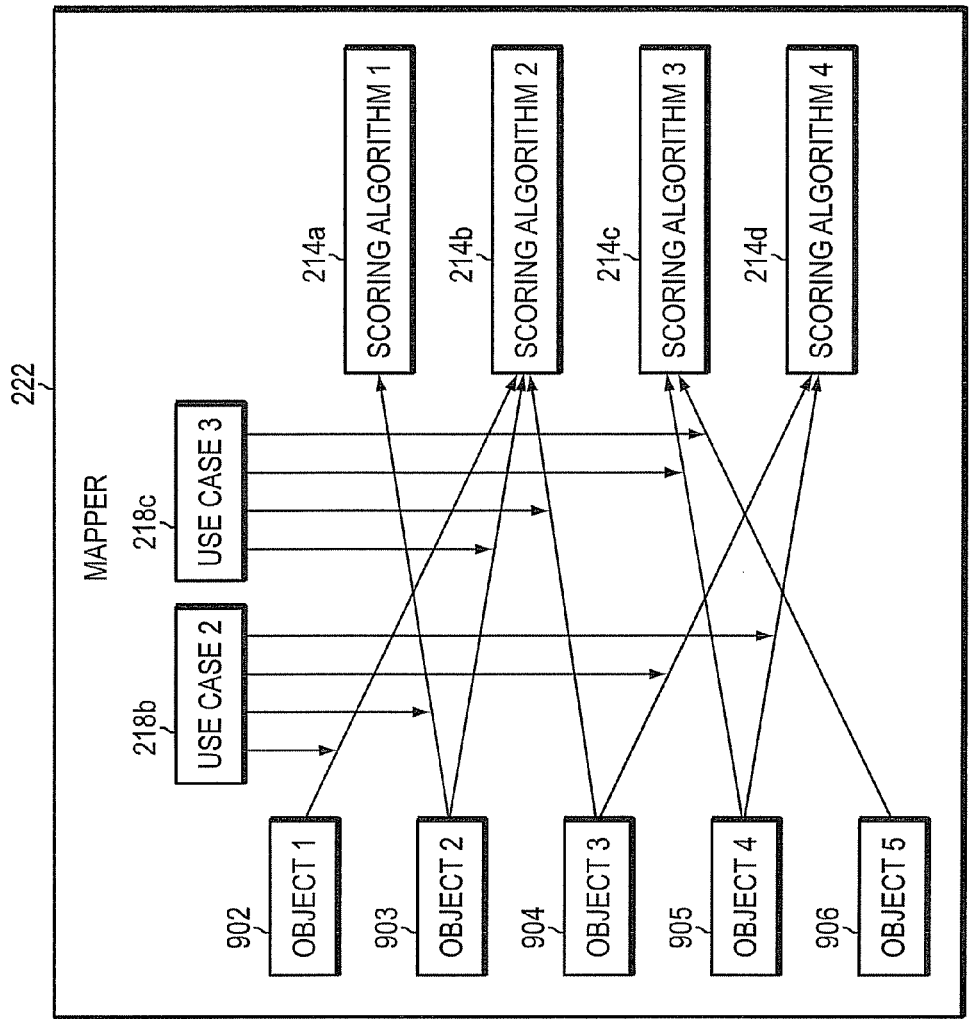

SYSTEM AND METHOD FOR FILE DIFFERENCING WITH IMPORTANCE RANKING

RELATED APPLICATIONS

This application is a Continuation of application Ser. No. 12/830,844 filed Jul. 6, 2010 for a System and Method for File Differencing with Importance Ranking by Malcolm A. Wood et al., which application is hereby incorporated by reference in its entirety.

BACKGROUND OF THE INVENTION

1. Field of the Invention

The present invention relates generally to computer processing and, more specifically, to systems and methods for comparing electronic objects to identify differences.

2. Background Information

In many fields of endeavor, numerous electronic objects, such as files, are often created. During the course of designing and building a new product or system, for example, large numbers of objects are typically created, revised, edited, and sometimes deleted, thereby generating multiple versions of each object. In particular, computer program files may be created and then updated as new features are added, errors are corrected, and old features are removed. Data files may be created and then modified as new data is acquired. In addition, two files may start out as identical copies, but diverge as they are updated and changed by different people or processes.

Oftentimes, managers and others are interested in evaluating the changes that have been made to an object from one version to the next. To determine the differences between two files, a differencing process is performed. A differencing process analyzes two or sometimes three files, and produces a technical description of the differences between or among them. The UNIX operating system, for example, includes a utility known as diff that compares the contents of two files. To run the diff utility, a user enters the diff command at a Command Line Interface (CLI) along with the names of the files. The Windows® operating system from Microsoft Corp. of Redmond, Wash. includes a similar utility called windiff that determines the differences between ASCII files.

SUMMARY OF THE INVENTION

Computer readable media may store instructions that, when executed by processing logic, identify the differences between versions of an electronic object. The instructions may store the versions of the object in a memory, and the object may have one or more attributes. The instructions may compare the versions of the object to identify the differences between the versions of the object, and may identify a characteristic of at least one identified difference. The instructions may select automatically from a plurality of available scoring algorithms a given scoring algorithm for the object. The selection of the given scoring algorithm may be based on the one or more attributes of the object. The instructions may compute a difference score for the object using the given scoring algorithm. The instructions may present the computed difference score to a user. The computed difference score may be a function of the differences identified between the versions of the object, and the characteristic of the at least one identified difference.

In an embodiment, a method may store a plurality of electronic objects in a memory, analyze a pair of objects to find the differences between them, assign a weight to each of the differences, calculate a difference score for the objects, and present the difference score on a display. The difference score may be a function of the assigned weights of the differences found between the pair of objects.

In an embodiment, an apparatus may include a memory that stores a plurality of electronic objects. The apparatus may also include a display, and a processor coupled to the memory and to the display. The processor, moreover, may be configured to compare a pair of matching electronic objects to identify the differences between the objects. The processor may also assign an importance level to each difference identified between the objects. The processor may compute a difference score for the objects. The difference score may be a function of the importance levels assigned to the differences between the pair of matching electronic objects. The processor may present the computed difference score on the display.

BRIEF DESCRIPTION OF THE DRAWINGS

The invention description below refers to the accompanying drawings, of which:

FIG. 4 is a schematic illustration of a report generated in accordance with an embodiment of the invention;

FIG. 5 is a schematic illustration of a detailed view of the identified differences between compared objects in accordance with an embodiment of the invention;

FIG. 8 is a schematic illustration of a use case in accordance with an embodiment of the invention; and FIG. 9 is a schematic illustration of a mapper in accordance with an embodiment of the invention.

DETAILED DESCRIPTION OF AN ILLUSTRATIVE EMBODIMENT

Overview

Figure 1:
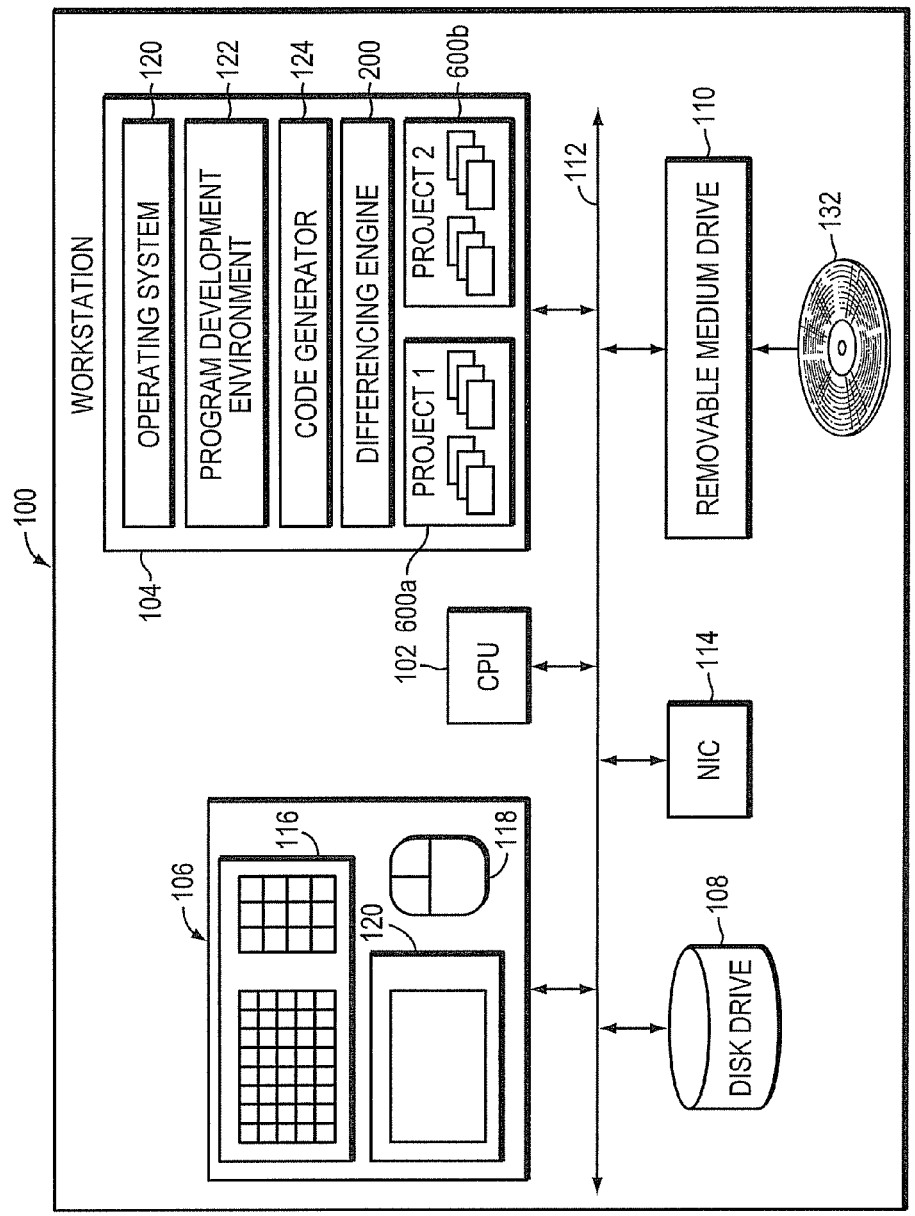
FIG. 1 is a schematic illustration of a computing platform in accordance with an embodiment of the invention.

Briefly, embodiments of the invention relate to a system and method for performing differencing between multiple versions of an object, such as a file, or between multiple objects. The system and method may be implemented through a differencing engine. The differencing engine may include a selector, a comparator, a scoring engine, and a report generator. The differencing engine may also include or have access to one or more differencing tools and to a plurality of scoring algorithms. The object versions to be analyzed are received at the differencing engine, and the selector retrieves or derives one or more attributes of the object.

Exemplary object attributes include file type, such as a C programming file, a text file, an eXtensible Markup Language (XML) file, etc. Furthermore, for C programming files, additional attributes may include whether the file is a source file, a header file, a make file, etc. If multiple differencing tools are provided, the selector may select one of the differencing tools. Using the selected differencing tool, the comparator analyzes the versions of the object, identifies the differences between the versions, and identifies a characteristic or quality of at least one of the identified differences. The comparator may also identify an overall change type between the object versions. Exemplary change types include modification, addition, and deletion types.

The selector may select one of the scoring algorithms based on the one or more attributes of the object. The scoring engine uses the selected scoring algorithm to compute a difference score for the object. The difference score may be a function of the extent of differences, i.e., the total number of differences, identified by the comparator, and at least some of the characteristics or qualities of those differences. More specifically, the scoring algorithm is specially designed such that differences deemed to be more significant are given a higher weight than differences deemed to be less significant.

The overall change type and the difference score may be provided to the report generator. The report generator may be configured to organize the difference scores and the change types for a plurality of objects, whose versions were evaluated, into a high-level, summary report having a table or array format. The report may be presented on a display, and may include an entry or row for each object whose versions were compared. Each entry may include an object name field, an overall change type field and a difference score field, among others. The entries of the array may be sorted in response to a selection of a given field by a user. For example, upon selection of a difference column, the entries of the array may be sorted, e.g., from highest difference score to lowest difference score. The report generator may also link the identified differences for a given object to the high-level, summary report, and may permit a user to navigate to these identified differences in order to obtain a greater level of detail regarding the differences identified among versions of the analyzed objects.

In an embodiment, a user may manually select or designate the objects whose versions are to be evaluated by the differencing engine. For example, the differencing engine may include a user interface component that generates a user interface, such as a graphical user interface (GUI), for presentation to the user. The GUI may include one or more controls through which the user can select the objects whose versions are to be evaluated, e.g., by file name.

In a further embodiment, the selection of objects may be performed programmatically, e.g., automatically, by the differencing engine. Specifically, the differencing engine may further include a mapper. The mapper may be configured to identify particular objects for comparison based on use cases. That is, the mapper may be preconfigured with a plurality of use cases. Each use case may correspond to or specify one or more classes of objects. A user, rather than manually identifying specific objects to the differencing engine, may specify a given use case.

For example, a first use case may be established for a system design phase of a product development program. This first use case, moreover, may only specify a design class of objects for comparison. A second use case may be established for a system testing phase of the product development program. This second use case may only specify those objects that fall within a test class. The mapper may search a project directory in order to identify all of the objects that match the class or classes corresponding to the use case specified by the user, e.g., all design objects or all test objects. The identified objects may then be analyzed by the differencing engine, as described above. A third use case may be established for Configuration Management. This third use case may specify files that were obtained from a software Configuration Management (CM) tool or system, which may be located on one or more remote machines, and modified on a user machine. The specified files may be compared to the respective files stored within the CM tool to identify the changes that have been made. Additional use cases may be established for systems that store files or objects in locations other than on the user's machine, such as Product Lifecycle Management (PLM) tools, relational databases, DVDs, etc.

In yet a further embodiment, the use cases may also specify the differencing tool and/or the scoring algorithm to apply to the class of objects corresponding to the use case.

Differencing System

FIG. 1 is a schematic illustration of a workstation 100 suitable for use with the present invention. The workstation 100 may include one or more processing elements, such as a central processing unit (CPU) 102, a main memory 104, user input/output 106, one or more mass storage devices, such as a disk drive 108, a removable medium drive 110, and one or more communication facilities, such as a network interface card (NIC) 114, that are interconnected by a system bus 112.

The main memory 104 may store, among other things, a plurality of programs, libraries or modules, such as an operating system 120, and one or more applications configured to run on top of the operating system 120, including a program development environment 122, a code generator 124, and a differencing engine 200. Also stored on the workstation 100 may be one or more projects, such as projects 600*a-b*. Projects 600 may be stored on the main memory 104, as illustrated, on the disk drive 108 and/or on other storage. Each project 600, moreover, may include a plurality of objects, such as files or other electronic data containers. Exemplary objects include computer source code files, text files, spreadsheets, binary files, databases, data files, graphical model files, etc.

The removable media drive 110 is configured to accept and read a computer readable media 132, such as a CD, DVD, floppy disk, solid state drive, tape, flash memory or other media. The removable media drive 110 may further be configured to write to the computer readable media 132. The user I/O 106 may include a keyboard 116, a pointing device, such as a mouse 118, and a display 120. It should be understood that other or additional user I/O may be provided, such as a touch screen, a touch pad, a camera, a microphone, a printer, etc.

Suitable processors for implementing the CPU 102 can include single or multicore processors, such as the Core®, Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

Suitable operating systems 120 include the Windows series of operating systems from Microsoft Corp. of Redmond, Wash., the Linux operating system, the MAC OS® series of operating systems from Apple Inc. of Cupertino, Calif., the UNIX® series of operating system, and the Android operating system from Google Inc. of Mountain View, Calif., among others.

It should be understood that the program development environment 122 may be a text-based programming system, a visual programming system, a graphical programming system or some combination thereof. Suitable program development environments 122 include the MATLAB® and Simulink® technical computing environments as well as the Stateflow® and SimEvents® modeling systems from The MathWorks, Inc. of Natick, Mass., the .NET programming system from Microsoft Corp., the LabVIEW programming environment from National Instruments Corp. of Austin, Tex., the Visual Engineering Environment (VEE) from Agilent Technologies, Inc. of Santa Clara, Calif., the Khoros development system from AccuSoft Corp. of Northborough, Mass., a C programming environment, a C++ programming environment, or various combinations thereof, among others. Suitable code generators 124 include the Real Time Workshop® code generator and the HDL Coder code generator both from The MathWorks, Inc.

Suitable workstations include Dell Precision series of workstations from Dell, Inc. of Round Rock, Tex., and the HP Z400, Z600 and Z800 series of workstations from Hewlett Packard Co. of Palo Alto, Calif., among others.

Nonetheless, those skilled in the art will understand that the workstation 100 of FIG. 1 is meant for illustrative purposes only and that the present invention may be used with other data processing devices, computer systems, processing systems or computational devices, such as personal computers (PCs), laptops, palm computers, tablet computers, and other portable computing devices, smart phones, electronic readers (e-readers), client terminals of client-server systems, grid or cloud computing systems, etc.

It should also be understood that the workstation 100 need not include the program development environment 122 or the code generator 124.

Figure 2:
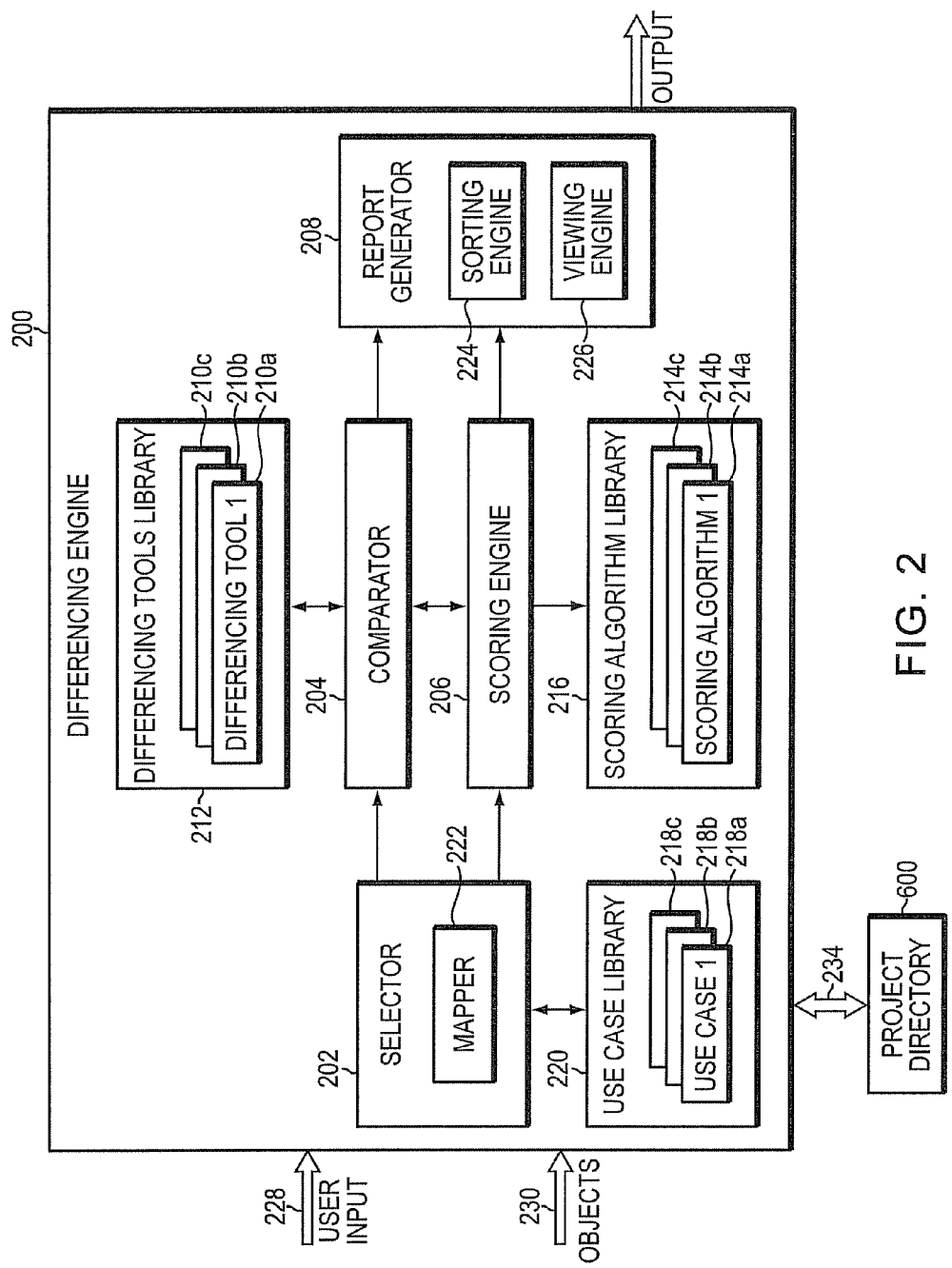
FIG. 2 is a schematic illustration of a differencing engine in accordance with an embodiment of the invention.

FIG. 2 is a functional, block diagram illustration of the differencing engine 200. The differencing engine 200 may include a selector 202, a comparator 204, a scoring engine 206, and a report generator 208. The differencing engine 200 may also include or have access to one or more differencing tools, such as differencing tools 210*a-c*, which may be stored at a differencing tool library 212, and to a plurality of scoring algorithms, such as scoring algorithms 214*a-c*, which may be stored at a scoring algorithm library 216. The differencing engine 200 also may include one or more use cases, such as use cases 218*a-c*, which may be stored in a use case library 220. The selector 202 may include a mapper 222, and the report generator 208 may include a sorting engine 224 and a viewing engine 226.

It should be understood that one or more of the components of the differencing engine 200 may be located or stored remotely relative to other components. For example, one or more of the scoring algorithms 214 may be accessed by the differencing engine 200 across a network, such as the Internet. The remote scoring algorithm, moreover, may be accessed through a service-oriented protocol.

The differencing engine 200 may receive user input, as indicated by arrow 228. As described herein, a user may input a designation of one or more objects, such as files, to be compared. In a further embodiment, the user also may indicate or select one or more use cases 218. The differencing engine 200 also may receive the designated objects and/or object versions to be analyzed, as indicated by arrow 230. In addition, the differencing engine 200 may have access to one or more project directories 600, as indicated by arrow 234. As described above, the project directory 600 may include a plurality of objects and versions of objects. The differencing engine 200 generates results or output, which may be in the form of a report, as indicated by arrow 236. The output may be presented to the user, e.g., via display 120 or by printing a hard, e.g., paper, copy. The results or output also may be in a form suitable for receipt and further processing by another computer program or application. For example, an Application Programming Interface (API) may be created for the differencing engine 200 so that other applications or processes may obtain all or portions of the results, e.g., through one or more Get( ) commands. Another form of the results or output may be an electronic representation, such as a file.

The selector 202, comparator 204, scoring engine 206 and report generator 208, among other components of the differencing engine 200, may comprise registers and combinational logic configured and arranged to produce sequential logic circuits. In an embodiment, the selector 202, comparator 204, scoring engine 206 and report generator 208 are or include software modules or libraries. The software modules or libraries can contain program instructions pertaining to the methods described herein, that may be stored on computer readable media, such as main memory 104, disk drive 108 and/or computer readable media 132, and executed by one or more processing elements, such as CPU 102. Other computer readable media may also be used to store and execute these program instructions. In alternative embodiments, various combinations of software and hardware, including firmware, may be utilized.

In an embodiment, the differencing engine 200 may be implemented as an add-on tool to the program development environment 122. Accordingly, the differencing engine 200 may analyze objects from within environment 122, and at least some of these objects may have been created and/or revised from within the program development environment 122.

Suitable differencing tools for use with the present invention include the UNIX diff utility, the Microsoft Windows windiff utility, the File and Directory Comparison Tool from The MathWorks, Inc., the WinMerge open source differencing and merging tool for Microsoft Windows, and the Araxis Merge file comparison software product from Araxis Ltd. of Isle of Man, UK, among others. For objects representing graphical models or block diagrams, a differencing tool as described in U.S. Pat. No. 5,974,254 issued Oct. 26, 1999 for a Method for Detecting Differences Between Graphical Programs, and S. Chawathe, A. Rajaraman, and J. Widom *Change Detection in Hierarchically Structured Information*, SIGMOD Conference, Montreal, Canada, June 1996, pp. 493-504, may be used, both of which are hereby incorporated by reference in their entireties.

It should be understood that the differencing tools may be included within the operating system or may be stand-alone applications or utilities.

Figure 3A:
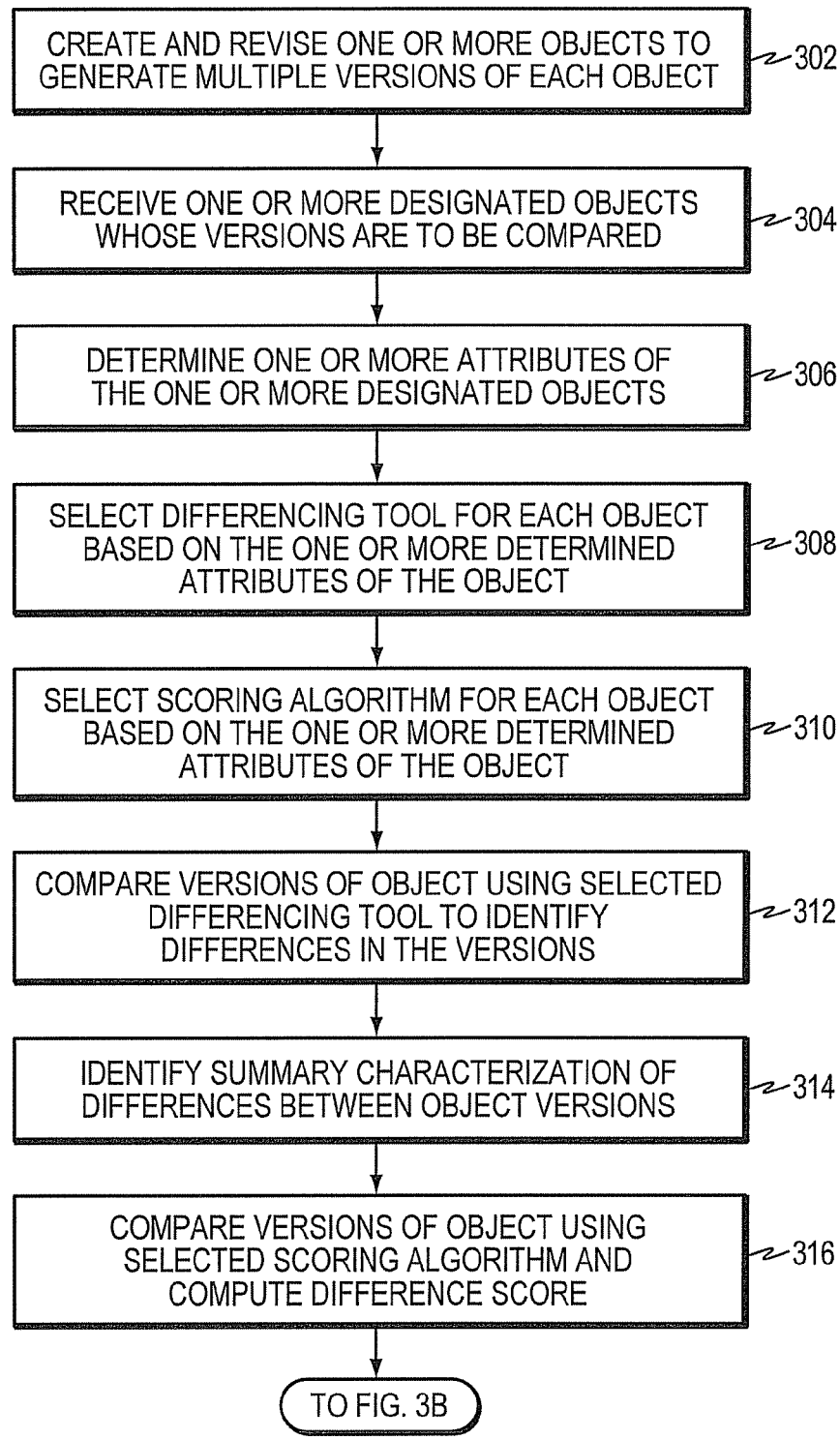
FIGS. 3A-B are flow diagrams of methods in accordance with embodiments of the invention.
Figure 3B:
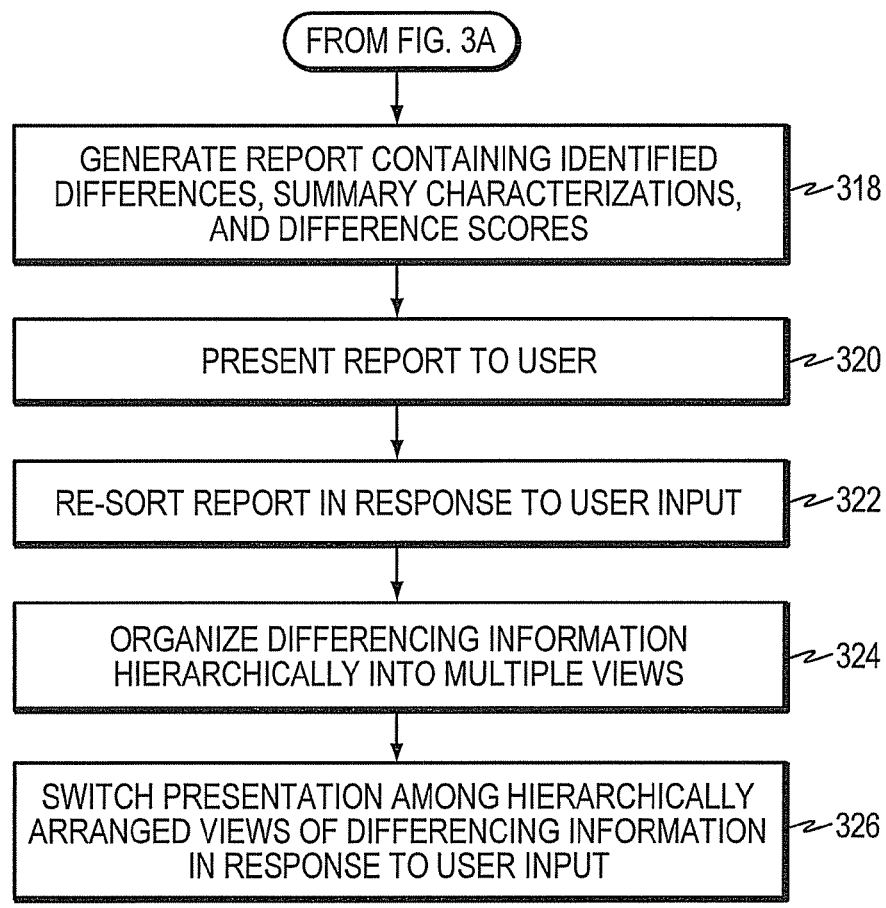

FIGS. 3A-B are a flow diagram of a method in accordance with an embodiment of the present invention. In operation, a plurality of electronic objects, may be created, as indicated at block 302. Specifically, authors, such as project managers, developers, programmers, hardware engineers, test engineers, marketing professionals, etc., may create one or more objects. More specifically, a programmer may utilize the keyboard 116, mouse 118 and computer display 120 of the user I/O 106 to operate the program development environment 122 in order to create an object, such as a computer source code file. Objects also may be created programmatically. Thus, objects, such as source or object code files, may be created automatically by the code generator 124 from high-level source files.

The objects, moreover, may be modified or revised, e.g., by adding new data to the objects, by deleting or modifying existing data within the objects, etc., thereby creating multiple versions of the objects, as also indicated at block 302. Thus, a given object may have a current version and one or more prior versions. In addition, a given object may have branched versions, in which case more than one current version may exist.

One or more objects whose versions are to be compared are received, e.g., at the workstation 100, as indicated at block 304. In an embodiment, the differencing engine 200 may provide a user interface (not shown), such as a graphical user interface (GUI) for presentation on the workstation's display 120. A user may interface with the GUI to designate the one or more objects to be analyzed. For example, the GUI may present one or more controls, such as a Directory or Open dialog box, that allow a user to navigate a file system, e.g., with the keyboard 116 and/or mouse 118, in order to locate and select objects and object versions for comparison. For example, the user may designate a current version, which represents the most up-to-date version of an object, and an earlier version, or the user may designate two different current versions of a branched object.

It should be understood that the user may alternatively designate one or more directories, folders or other data containers that contain or reference a plurality of objects and/or object versions that are to be compared. It should be further understood that a user may designate two objects to be compared, instead of designating two versions of an object. It should also be understood that a user may designate more than two objects, e.g., three objects, for comparison.

The selector 202 examines the one or more designated objects to identify respective attributes of the one or more objects, as indicated at block 306. Exemplary attributes include an object's file type, and root element for XML files or objects. For example, suppose the user designated a file folder containing a plurality of C programming files. The selector 202 may determine that a first attribute of these objects is a C programming file attribute. Suppose further that the folder includes source files, header files, make files, and documentation files, such as HTML documentation files. For the source files, the selector 202 may further determine that an additional attribute of these files is a source file attribute. For the header files, the selector 202 may further determine that an additional attribute of these files is a header file attribute, and so on.

In an embodiment, the selector 202 may be configured to examine the file extension of the object to identify the one or more attributes for that object. For example, the selector 202 may be configured to assign the C programming file and source file attributes to objects having a .c extension. Similarly, the selector 202 may be configured to assign the C programming and header file attributes to objects having a .h extension.

The selector 202 may be configured to examine additional features of a designated object, in addition to its file extension, to determine the object's one or more attributes. For example, as indicated above, for XML objects or files, the selector 202 may examine the root element. For the Microsoft Word XML file format, the root element has the form <w:wordDocument>. For the Simulink Manifest file format, the root element has the form <DependencyReport>.

The selector 202 may choose a particular differencing tool 210 from the differencing tool library 212 for each object based on the one or more attributes of the object, as indicated at block 308. For example, for an ASCII text file, the selector may choose the windiff utility. For an XML file, the selector 202 may choose the above-referenced Chawathe algorithm. For a binary executable object, the selector 202 may choose the Reflector Diff AddIn.

The selector 202 also chooses a scoring algorithm 214 from the scoring algorithm library 216 for each object based on the one or more attributes of the object, as indicated at block 310. In particular, the selector 202 may maintain or have access to a database (not shown) that associates object attributes with scoring algorithms. The association of object attributes to scoring algorithms may be predefined. The selector 202 may perform a lookup on the database using the one or more attributes derived for an object to identify the corresponding scoring algorithm for that object.

For example, the selector 202 may identify the following scoring algorithm 214 for an object determined to have the C programming and source file attributes:

$$\text{difference score} = (M - (C/2)) * S$$

where

M is a total number of the differences detected in the versions of the source file, C is a total number of the differences detected in the comment lines of the source file versions plus a number of the differences detected in the non-comment lines that are solely whitespace differences, and S represents a value assigned to source file types. In an embodiment, S is set to the value of 1.

For an object determined to have the C programming and header file attributes, the selector 202 may identify the following scoring algorithm 214:

$$\text{difference score} = (M - (C/2) * H \text{ where}$$

M is a total number of the differences detected in the versions of the header file, C is a total number of the differences detected in the comment lines of the header file versions plus a number of the differences detected in the non-comment lines that are solely whitespace differences, and H represents a value assigned to header file types. In an embodiment, the value of H is 0.5.

In an embodiment, each scoring algorithm 214 is designed so that those differences deemed to have greater significance, such as differences in the main programming lines of a C programming source file, are assigned a higher weight than those differences deemed to have less significance, such as differences to the comment lines of a C programming file, differences to a copyright notice, differences to a date of modification, and differences that are simply the addition or removal of whitespaces. Accordingly, the difference score computed by each scoring algorithm provides a measure of the significance or importance ranking of the changes that have been made to the object. For example, difference scores may be numeric values, and a high difference score may indicate a large number of significant, i.e., relatively important, changes to the object. On the other hand, a low difference score indicates that the changes (even though there may be many) are relatively insignificant. The difference score thus provides an indication as to the noteworthiness of the changes made to an object, as opposed to simply being an indication of a total number of differences that have been made to the object. It also provides a way to rank the changes made to a plurality of objects by importance, as described herein.

The ranking of changes may also be a partial order. For example, differences in a first set of attributes may be ranked independently from differences in a second set of attributes. The ranking may then be a higher dimensional value, which may be represented in a multidimensional space, a graph, etc.

For an object determined to have a .mat file attribute, e.g., a file having a .mat extension, the selector 202 may identify the following scoring algorithm:

$$\text{difference score} = \text{added\_or\_removed} + \text{modified}$$

where added_or_removed is the number of variables that appear in one version or object only, and modified is the number of variables that appear in both versions or objects, but have different values.

It should be understood that this scoring algorithm may be refined to give a greater weighting to variables, such as numeric matrices, that contain more elements, or to give a lower weighting to variables in which only a few elements are different.

For an object determined to have an .xml file attribute, e.g., a file having an .xml extension, the selector 202 may identify the following scoring engine:

difference score=(added_or_removed+modified+ moved)/total_number_of_nodes where added_or_removed is the number of nodes that appear in one version or object only, modified is the number of nodes that appear in both versions or objects, but have been modified, moved is the total number of nodes that are themselves unchanged but that have moved within the hierarchical structure of the .xml versions or objects, and total_number_of_nodes is the number of nodes in the first .xml object or version added to the number of nodes in the second .xml object or version.

It should be further understood that, in other embodiments, the selection of the differencing tool 210 and the scoring algorithm 214 to be used for a given object may be performed by the comparator 204 and the scoring engine 206 themselves, or by other components. For example, the functionality of the selector 202 may be distributed among the comparator 204 and the scoring engine 206.

The selector 202 may provide or pass the identity of the selected differencing tool 210 and the scoring algorithm 214 to the comparator 204 and the scoring engine 206, respectively. The comparator 204 compares the received versions of the object by applying the selected or chosen differencing tool 210 from the differencing tools library 212, as indicated at block 312. Application of the differencing tool 210 by the comparator 204 may produce a technical description of the differences between the versions of the object. That is, the differencing tool 210 may identify each difference between the two versions. It may also identify the kind or characteristic of the difference, e.g., addition of white space, modification of main text line, etc.

The differencing tool 210 may additionally be designed or configured to derive an overall or main characterization of the changes between the versions of the object being compared, as indicated at block 314. For example, when comparing two folders of objects, an object that appears only in the current version may have an overall characterization of Added. An object that appears only in the prior version may have an overall characterization of Deleted.

In addition, meta information regarding the changes that have been made to an object, project, etc. may be stored. Exemplary meta information includes undo information. The meta information may be used to establish relationships between different versions of objects.

To the extent a user selects two directories or folders of objects for comparison, the selector 202 may identify the particular objects within each directory that are to be compared against each other. The selector 202 may match objects having the same file name from the two directories for comparison. That is, the selector 202 may use file names to designate the object pairs for comparison. It should be understood that this functionality may be implemented in the comparator 204.

The scoring engine 206 applies the selected scoring algorithm 214 to compute a difference score for the object versions being analyzed, as indicated at block 316. The scoring engine 206 may obtain the actual, technical differences in the object versions from the comparator 204, such as the extent, i.e., the total number, of differences, the number of differences to comment lines, etc., for use in computing the difference score. That is, the scoring engine 206 may obtain at least some of the input values needed to compute the difference score based on the analysis performed by the comparator 204.

It should be understood that the scoring engine 206 may be configured to compute a difference score for folders as well as for objects or files. The score computed for a pair of folders being analyzed may be determined by summing the difference scores computed for the objects or files within the folders, which may apply weight factors to the respective scores. The computation of difference scores for folders may be performed in response to a request from the user. In an alternative embodiment, for performance purposes, the scoring engine 206 may be configured to compute the difference score for selected folders as a background process, or on another core of a multi-core processor, among other alternatives.

The technical differences identified by the comparator 204, the overall characterization of the changes, and the computed difference score for the objects may be provided by the comparator 204 and the scoring engine 206 to the report generator 206. The report generator 208 may organize the received information in the form of a report, as indicated at block 318 (FIG. 3B). The report, moreover, may be presented to the user by the report generator 208, as indicated at block 320. For example, the report may be presented on the display 120 of the workstation 100. Alternatively or additionally the report may be printed.

FIG. 4 is an illustration of an exemplary, high-level, summary report 400 produced by the report generator 208, e.g., for display on the workstation's display 120. The report 400 may be formatted as a table or array having a plurality of columns and entries or rows whose intersections, i.e., cells, hold data. Specifically, the report 400 may include a Type column 402, an Object Name column 404, a Prior Version column 406, a Current Version column 408, a Change Summary column 410, and a Difference Score column 412. The Prior Version column 406, moreover, may be subdivided into a Size column 414 and a Last Modified column 416. Similarly, the Current Version column 408 may be sub-divided into a Size column 418 and a Last Modified column 420. Additionally, the report 400 includes a plurality of rows or entries, such as entries 422a-j. Each entry 422, moreover, corresponds to an object, such as a file, whose versions have been compared. The objects corresponding to the rows or entries 422 of the report 400 may belong to a given directory or folder that was selected by the user for differencing. For example, the objects of the prior version column 406 may correspond to the objects from the folder C:\Work\curvefitting, while the objects of the current version column 408 may correspond to the objects from folder C:\Work\curvefitting2.

The report generator 208 may generate the summary report 400 such that the entries 422 may be sorted based on the information or data in the cells. That is, in response to a user selecting a column, e.g., with the mouse 118, the sorting engine 224 of the report generator 208 may re-sort the entries 422 of the report 400 based on the data or information in the selected column, as indicated at block 322. A symbol, such as caret symbol 424, may be presented by the report generator 208 in the report 400 to designate the particular column, e.g., the Type column 402, on which the report 400 is currently sorted. The caret symbol 424, moreover, may point up to indicate that the selected column is sorted in ascending order, or the caret may point down to indicate that the selected column is sorted in descending order.

In response to the user selecting the Difference Score column 412, the sorting engine 224 may sort the report 400 so that the objects with the highest difference scores are at the top of the report 400. That is, the sorting engine 224 ranks the objects by the importance or significance of the changes that have been made to the objects. Accordingly, the user can quickly determine which objects have undergone the most significant change between the current version and the prior version, as determined by the one or more scoring algorithms 214. In response to the user selecting the Change Summary column 410, the sorting engine 224 may sort the report 400 in terms of the types of differences. The user can thus quickly determine, e.g., which new objects have been added or which old objects have been removed.

In an embodiment, the report generator 208 may link or hierarchically organize information regarding the objects and the differences that were determined into multiple views, as indicated at block 324. Furthermore, the report generator 208 may configure the report 400 to be interactive so that the user may navigate among the various views or levels to obtain the desired degree of information. The report 400, moreover, may represent a top-level view of the hierarchy, providing high-level, summary information for all of the objects of the selected directories or folders. A user, moreover, may navigate among the various levels of the hierarchy to obtain a greater level of detail regarding the differences between the versions of an object. For example, a user may select a given object in the report 400. In response to user selection of an object displayed in the report 400, the viewing engine 226 of the report generator 208 may be configured to switch to another, e.g., more detailed view, as indicated at block 326.

More specifically, within an entry such as entry 422e that corresponds to an object in both the prior and current versions, a command button, such as compare button 426 may be provided. In response to the user selecting the compare button 426, the viewing engine 226 may generate a more detailed view of the differences identified in the two versions of the respective object, i.e., the lengthoffline.m file. That is, the more detailed view may be linked to the summary report 400 through the compare button 426.

Figure 5:
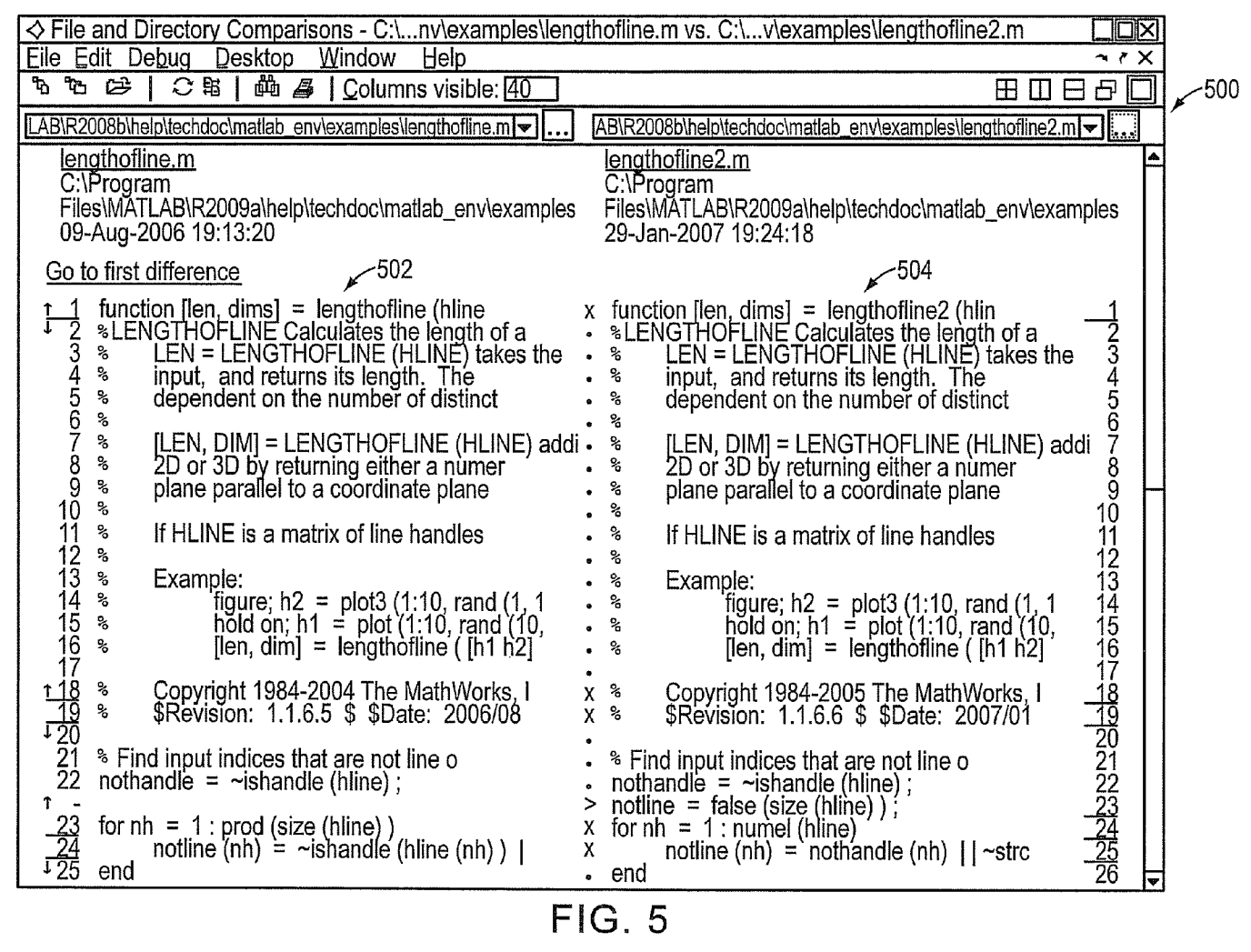

FIG. 5 is an illustration of a more detailed view 500 generated by the viewing engine 226 of the report for a selected object. The more detailed view 500 may provide a line-by-line indication of the differences identified in the two versions. Specifically, the more detailed view 500 may include a left side 502 that presents the prior version of the object and a right side 502 that presents the current version. The two sides 502, 204 may be aligned with each other, in a side-by-side manner, to illustrate the identified differences. The more detailed view 500 may employ symbols and color coding to indicate the differences between respective lines of the two versions. For example, pink highlighting and an x symbol at the start of a line may indicate that the content of the lines differs between the two versions. Green highlighting and a > symbol at the start of a line may indicate a line that exists in the file presented on the right 504, but not in the file presented on the left 502. Green highlighting and a<symbol at the end of a line may indicate a line that exists in the file presented on the left 502, but not in the file presented on the right 504.

To return to the top-level report 400, the user may close the more detailed view 500. Alternatively or additionally, the detailed view 500 may include a return command button (not shown).

In an embodiment, one or more of the scoring algorithms may be configurable, e.g., by the user. For example, a scoring algorithm may include settable parameters as weights for one or more detected differences, such as additional spaces, capitalizations, block positions within graphical models, block names within graphical models, etc. A user may then assign values, including a value of zero, to one or more of the settable parameters, thereby customizing the difference algorithm to the user's needs. Furthermore, one or more of the scoring algorithms may consider meta information changes or differences, such as who made the changes to the object, in what time interval were the changes made, from what geographic location were the changes made, from what machine or terminal or from what type of machine or terminal were the changes made, etc. This meta information, moreover, may be assigned weights that are configurable.

In particular, an exemplary scoring algorithm is:

$$\text{difference score} = (Wf*F + Wc*C)*S$$

where,

Fis the number of changes to functional lines of an object, e.g., a source code file, Wf is a user settable weighting applied to the number of functional line changes, C is the number of changes to comment lines of the object, Wc is a user settable weighting applied to the number of comment line changes, and S is a user settable value assigned to source code file types.

A user interested in the functional changes to the source code file may choose a high Wf value and a low Wc value. Another user interested in the documentation changes to the source code file may choose a low Wf value and a high Wc value.

In an embodiment, the scoring engine 206 may be configured to provide presets for the weights, Wf and Wc. The scoring engine 206 also may provide multiple sets of different weightings, and the user may select the most suitable set for his or her purposes. In addition, the scoring engine may allow the user to set one or more of the weights, e.g., Wf and Wc, manually. Those skilled in the art will understand that user settable weights may be implemented with other, possibly far more complex, scoring algorithms.

Use Cases

In an embodiment, numerous people may be involved in the creation of a software, hardware or combination software/hardware system or product. The product, for example, may be a mobile phone, an engine control unit (ECU), an aircraft flight control system, etc. The development of such a complex system or product may follow a formal or informal development cycle having several stages during which numerous objects are created, revised and possibly deleted. A well-known product development model or cycle is the V-model. The V-model consists of a number of phases, including a Requirements Phase, a Design Phase, a Development Phase, a Testing Phase, a Documentation Phase, and a Deployment Phase represented in a V-shaped diagram.

During the Requirements Phase, the requirements of the system are defined, e.g., by analyzing the needs of users and/or customers. One or more user requirements files may be created and revised during this phase. The user requirements files may be text or diagram files that describe or illustrate the functional, performance, security, and other requirements of the proposed system. Suitable user requirements file formats include text, Hyper Text Markup Language (HTML), spreadsheet files, word processing files, drawing or diagram files, and Portable Document Format (PDF) files, among others. The user requirements files may be created with a system requirements tool, such as the IBM Rational DOORS® software product from IBM Corp. of Armonk, N.Y.

During the Design Phase, system engineers may study the user requirements files and develop a design of the system.

Numerous objects may be created, revised and deleted during this phase. For example, the system engineers may create one or high-level design files, such as System, Functional, Architectural, Software and/or Hardware Specifications, which may serve as blueprints for the proposed system. These files may provide a list of the various components or modules of the system, a description of the functionality of each component or module, and a description of their interfaces. These files may also describe databases, data structures and other details of the system. In addition, system testing files may also created during the Design Phase. Exemplary design file formats include text, HTML, and spreadsheet files, among others.

During the Development Phase, programmers, hardware engineers, and other developers create software, firmware, hardware elements, and other components based on the design files. For example, the system design described in the design documents may be coded. Numerous objects may be created, revised, and deleted during this phase. These objects may include computer source code files, header files, makefiles, documentation files, etc. At least some of the files may be compatible with one or more programming languages, such as C, C++, the MATLAB development environment, the Simulink modeling environment, the .NET framework, VHDL, Verilog, etc. There may also be one or more derived files, such as C or C++ source or object code files that were derived from other, typically higher-level source files. For example, C, C++, VHDL or Verilog code may be generated from one or more files created in the MATLAB development and/or the Simulink modeling environment by the code generator 124.

In a Model-Based Design or Model-Based Engineering approach to system development, one or more graphical models of the entire system may be created and revised. The graphical models may be or may include one or more block diagrams and/or state charts. The models, moreover, may be executable, and thus may be simulated to test their performance and operation. As indicated above, production quality code may be automatically generated from one or more of the block diagrams or state charts of the models. Exemplary modeling systems include the Simulink modeling environment from The MathWorks, Inc.

During the Testing Phase, a prototype system may be built and tested. The prototype system may be tested against the requirements developed during the Requirements Phase. In addition to testing a prototype of the entire system, testing may be performed on one or more components or modules. Numerous objects may be created, revised, and possibly deleted during this phase. For example, a test specification file that describes the tests to be performed and the manner in which they are to be carried out may be created. Test vectors may be created for use during the Testing Phase. Test data may be generated and stored in data objects, such as databases. In addition, one or more Test Reports that describe the results of the testing may be created.

During the Documentation Phase, materials containing information regarding the use and operation of the system are created. As with the other phases, numerous objects may be created, revised and deleted during this phase. For example, technical writers may produce User's Guides, Reference Manuals, Repair and Troubleshooting Guides, Help programs, etc. These objects may be in the form of text files, HTML files, help files, etc.

In addition, objects that document or memorialize the internal design of software, the algorithms developed or used, Application Programming Interfaces (APIs) or other interfaces, for the purpose of future maintenance and enhancement may also be created during the Documentation or other phases. The MATLAB Report Generator and the Simulink Report Generator documentation tools from The MathWorks, Inc., for example, may be used to automatically create documentation from Simulink and Stateflow models. These tools allow users to document software requirements and design specifications, and produce reports.

During the Deployment Phase, objects created during the Development Phase may be modified to support the commercial distribution of the system or product. For example, objects may be optimized to support large scale production. In addition, object files created during the Development Phase may be grouped together with objects created during the Documentation Phase, such as a User's Manual, and compressed, e.g., with a zip utility, to produce an archive, such as a zip file.

It should be understood that there could be other phases, such as a Training and Support Phase, a Maintenance Phase, a Marketing Phase, etc. It should also be understood that other product or system development models besides the V-model may be used.

The objects created during the development of the system or product may be logically organized into one or more project directories. Each project directory may have a plurality folders and subfolders providing further logical organization of the objects. The project directory, folder and subfolders, moreover, may be organized in a hierarchical tree structure.

Figure 6:
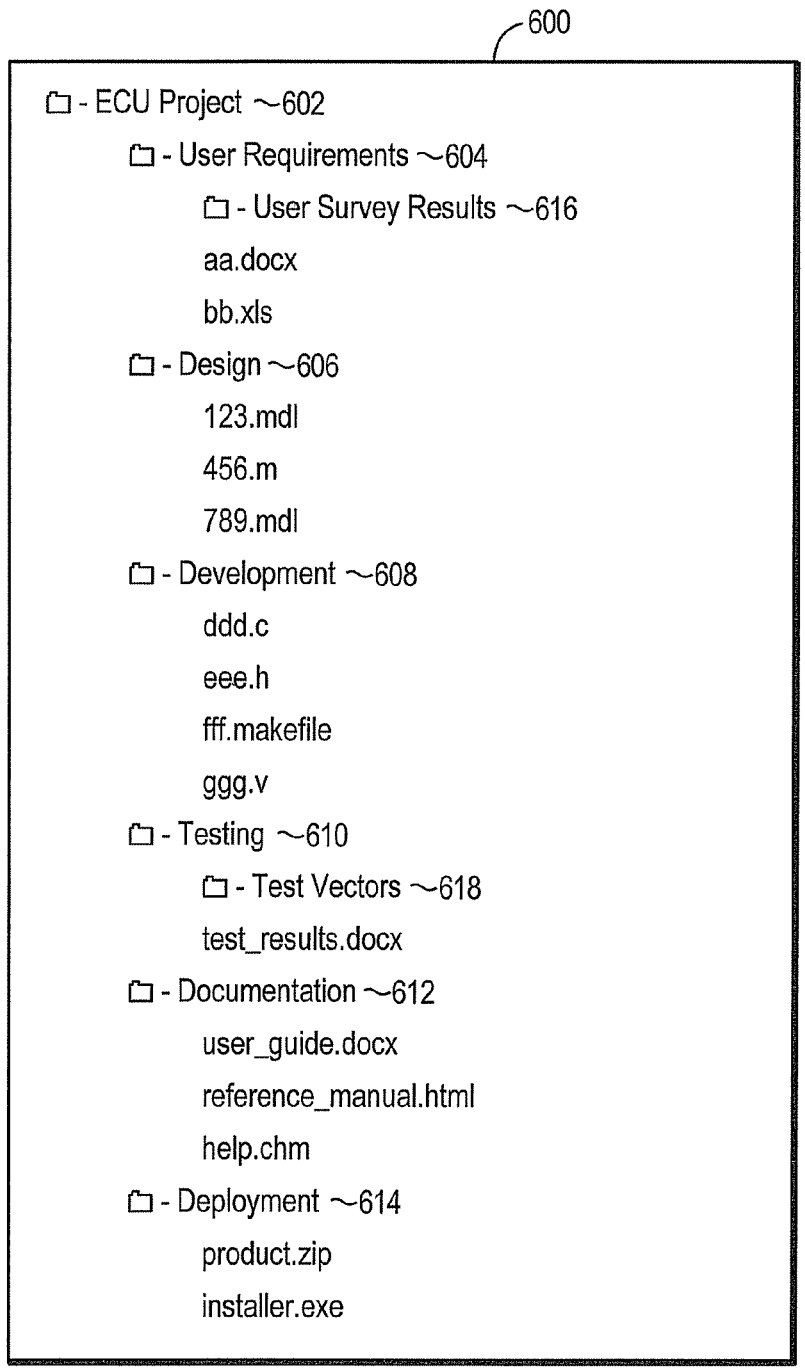
FIG. 6 is a schematic illustration of a project directory in accordance with an embodiment of the invention.

FIG. 6 is a schematic illustration of a project directory 600 for a system or product being developed. The project directory 600, which may be organized as a tree, may include a root folder 602 that may specify the project, e.g., "ECU Project". The root folder 602 may contain a plurality of folders that correspond to different phases of development, such as a User Requirements folder 604, a Design folder 606, a Development folder 608, a Testing folder 610, a Documentation folder 612, and a Deployment folder 614. Within each folder 604-614, moreover, may be one or more objects and/or one or more sub-folders containing objects. For example, the User Requirements folder 604, which may contain all of the requirements documents that were created for the system being developed, may include a User Survey Results sub-folder 616. The Testing folder 610 may include a Test Vectors sub-folder 618. For each object, moreover, there may be a current version and at least one prior version in the project directory 600. In an embodiment, there may be multiple prior versions of an object. Alternatively, there may be a current project directory 600 and a prior project directory that stores prior versions of one or more of the objects.

It should be understood that requirements or other files may be identified automatically with a tool, such as the Simulink Manifest tool, which may be used to identify requirements files for Simulink models.

Figure 7:
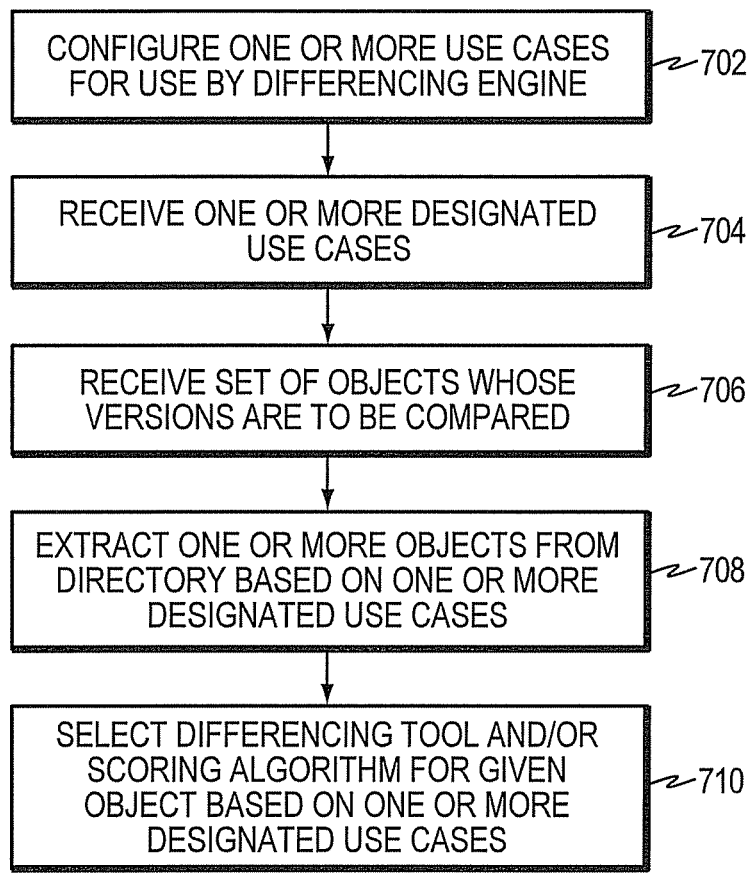
FIG. 7 is a flow diagram of a method in accordance with an embodiment of the invention.

FIG. 7 is a flow diagram of a method in accordance with an embodiment of the invention. The differencing engine 200 may be configured to include a plurality of predefined use cases 218, as indicated at block 702. The use cases may be implemented through the mapper 222. As described herein, each use case 218 specifies a class or category of objects that are to be analyzed by the differencing engine 200. A user may designate or specify one or more use cases as well as a group of objects, such as a project directory 600, as indicated at block 704. The designated use case and the group of objects, moreover, may be received by the differencing engine 200, as indicated at block 706.

The mapper 210 traverses the designated project directories 600, and extracts certain objects based on the one or more uses cases that it received, as indicated at block 708. For example, a project manager may select a User_Requirements use case. The User_Requirements use case includes a predefined listing of object classes and/or object metrics or characteristics. For example, a first class of the User_Requirements use case may be objects within the User Requirements folder 604 of the project directory 600. A second class of the User_Requirements use case may be objects anywhere in the directory 600 that have a certain file name or term within their file names, such as the terms "survey" or "feedback".

More specifically, objects are associated with one or more metrics or characteristics. Each use case 218, moreover, may include a predefined list of one or more metrics or characteristics. Objects having the one or more metrics or characteristics listed in a use case match that use case. Exemplary object metrics or characteristics include:

the particular phase for which the object was created, e.g., Requirements, Design, Development, etc., for an object that is a file, its file type, which may be represented by its extension, such as a Microsoft Word file type (.docx), a Microsoft Excel file type (.xls), a MATLAB file type (.m and .mat), a Simulink model file type (mdl), a Winzip utility file type (.zip), a eXtensible Mark-up Language (XML) file type (.xml), a Hypertext Markup Language file type (.html), etc., and an xml root element.

In another example, a model design engineer may select a Design use case. FIG. 8 is a schematic illustration of a Design use case 218a. The Design use 218a may include a list of metrics or characteristics, such as Design phase objects and .mdl file type objects located anywhere in the project directory 600. The .mdl objects correspond to graphical models created with the Simulink® technical computing environment.

By employing use cases 218, a user need not specify each object or folder of interest. Instead, the appropriate objects are mapped by the use case 218, and the mapper 222 may search the project directory 600 to identify the objects that match the criteria of the use case 218.

The identified objects may then be provided to the selector 202 so that differencing tools 210 and scoring algorithms may be identified and applied, as described above.

In an embodiment, a use case 218 may alternatively or additional identify the differencing tool and/or the scoring algorithm to be used for a given object whose versions are to be analyzed, as indicated at block 710. That is, the mapper 222 may choose a particular differencing tool 210 and scoring algorithm 214 to apply to an object based on the use case 218 indicated by the user.

FIG. 9 is a schematic, partial illustration of an embodiment of the mapper 222. Within the mapper 222 may be a plurality of mappings of objects, such as objects 902-906, to scoring algorithms, such as scoring algorithms 214a-d, as a function of a plurality of use cases, such as use cases 218b and 218c. Specifically, object 902 may be analyzed by scoring algorithm 214b. In addition, object 903 may be analyzed by either scoring algorithm 214a or scoring algorithm 214b. Similarly, object 904 may be analyzed by either scoring algorithm 214b or scoring algorithm 214d. Object 905 may be analyzed by either scoring algorithm 214b or 214d, and object 906 may be analyzed by scoring algorithm 214c.

It is the use cases 218, moreover, that determine which particular scoring algorithm 214 is to be used for a given object during a given differencing run. For example, with use case 214b, object 902 is mapped to scoring algorithm 214b, object 903 is mapped to scoring algorithm 214a, and objects 904 and 905 are mapped to scoring algorithm 214d. As object 906 does not meet any of the metrics or characteristics of use case 218b, there is no mapping of object 906. With use case 218c, objects 903 and 904 are mapped to scoring algorithm 214b, and objects 905 and 906 are mapped to scoring algorithm 214c. As object 902 does not meet any of the metrics or characteristics of use case 218c, there is no mapping of object 902.

It should be understood that FIG. 9 is meant for illustrative purposes only and that the mapper 222 may map a large number objects to a large number of scoring algorithms 214 based on the use cases 218. It should also be understood that the mapper 222 may be implemented in software or hardware, and may utilize a plurality of data structures. It should be further understood that the use cases may map matching objects to differencing tools in a similar manner.

The foregoing description has been directed to specific embodiments of the present invention. It will be apparent, however, that other variations and modifications may be made to the described embodiments, with the attainment of some or all of their advantages. For example, a user may select the differencing tool and/or the scoring algorithm to be used. Therefore, it is the object of the appended claims to cover all such variations and modifications as come within the true spirit and scope of the invention.

What is claimed is:

1. One or more non-transitory computer readable media, comprising:

one or more instructions that, when executed by a processor of a device, cause the processor to:

compare versions of an object to identify characteristics of differences between the versions of the object, the object having an attribute:

selecting from a plurality of available scoring algorithms a given scoring algorithm for the object, the selection of the given scoring algorithm based on the attribute of the object;

assigning, by the given scoring algorithm, a first weight to a first characteristic of the identified differences, the first weight associated with a relative importance of the first characteristic;

assigning, by the given scoring algorithm, a second weight to a second characteristic of the identified differences, the second weight associated with a relative importance of the second characteristic; and computing a difference score for the object using the given scoring algorithm, wherein the computed difference score is a function of the identified characteristics of the differences.

2. The one or more non-transitory computer readable media of claim 1 where the selecting of the given scoring algorithm is based on a user selection.

3. The one or more non-transitory computer readable media of claim 1 where the selecting of the given scoring algorithm is performed automatically.

4. The one or more non-transitory computer readable media of claim 1 where the object is a source code file.

5. The one or more non-transitory computer readable media of claim 4 where the attribute of the object is a file type.

6. The one or more non-transitory computer readable media of claim 1 where the object is a project, and the project includes a plurality of files.

7. The one or more non-transitory computer readable media of claim 1 wherein the one or more instructions further cause the processor to:

compare versions of multiple objects each having an attribute;

select from the plurality of available scoring algorithms a respective scoring algorithm for each object, the selection of the respective scoring algorithm based on the attribute of each object; and computing a difference score for each object using the respective scoring algorithm.

8. The one or more non-transitory computer readable media of claim 7 wherein the one or more instructions further cause the processor to:

generate a report that includes the computed difference scores for the objects.

9. The one or more non-transitory computer readable media of claim 8 where the report:

includes an entry for each object; and is sortable by the computed difference scores.

10. A method comprising:

storing a plurality of electronic objects in a memory;

analyzing, by a processor coupled to the memory, a pair of matching electronic objects to find a plurality of differences between the pair of matching electronic objects using a given scoring algorithm selected from a plurality of available scoring algorithms, the selection of the given scoring algorithm based on attributes of the electronic object;

assigning weights to the differences that were found between the pair of matching electronic objects, the weights assigned based on a relative importance of the differences found in the pair of matching electronic objects;

calculating, by the processor, a difference score for the pair of matching electronic objects where the difference score is a function of the assigned weights of the differences found between the pair of matching electronic objects; and presenting the difference score on a display coupled to the processor.

11. The method of claim 10 wherein the assigned weights are proportional to the relative importance of the differences found in the pair of matching electronic objects.

12. An apparatus comprising:

a memory storing a plurality of electronic objects;

a display; and a processor coupled to the memory and the display, the processor configured to:

compare a pair of matching electronic objects to identify differences between the pair of matching electronic objects using a given scoring algorithm selected from a plurality of available scoring algorithms, the selection of the given scoring algorithm based on attributes of the electronic objects, assign importance levels to the differences that were identified between the pair of matching electronic objects, compute a difference score for the pair of matching electronic objects, and where the difference score is a function of the importance levels assigned to the differences identified between the pair of matching electronic objects, and present the computed difference score on the display.

13. The apparatus of claim 12 wherein the difference score is further a function of the differences identified between the pair of matching electronic objects.

14. One or more non-transitory computer readable media, comprising:

one or more instructions that, when executed by a processor of a device, cause the processor to:

receive a designation of a use case;

access a project directory having a plurality of objects;

identify automatically a set of objects from the project directory based on the received use case;

compare pairs of objects from the set to identify differences between the pairs of objects using a given scoring algorithm selected from a plurality of available scoring algorithms, the selection of the given scoring algorithm based on attributes of the pair of objects; and present at least some of the identified differences between the pairs of objects on a display.

15. The one or more non-transitory computer readable media of claim 14 wherein at least some of the pairs of objects that are compared are different versions of the same object.

16. The one or more non-transitory computer readable media of claim 14 wherein the plurality of objects are associated with a plurality of categories, the use case refers to at least one of the categories, and the objects in the set of objects are associated with the at least one of the categories.

17. The one or more non-transitory computer readable media of claim 16 wherein the one or more instructions further cause the processor to:

map the plurality of objects of the project directory to the plurality of categories.

18. The one or more non-transitory computer readable media of claim 14 wherein the received use case identifies a differencing tool for comparing at least some of the pairs of objects.

19. The one or more non-transitory computer readable media of claim 14 wherein the one or more instructions further cause the processor to:

utilize a scoring algorithm to compute a difference score for at least some of the pairs of objects, the scoring algorithm specified by the received use case.

20. The one or more non-transitory computer readable media of claim 14 wherein the received use case is:

a design phase use case;

a testing phase use case; or a configuration management use case.

21. The one or more non-transitory computer readable media of claim 14 wherein the plurality of objects of the project directory are associated with a plurality of categories including a design phase category and a testing phase category, the use case refers to the design phase category, and the objects in the set are associated with the design phase category.

* * * * *

UNITED STATES PATENT AND TRADEMARK OFFICE
CERTIFICATE OF CORRECTION

| | | |
|---|---|---|
| PATENT NO. | : 9,104,743 B1 | Page 1 of 1 |
| APPLICATION NO. | : 13/768854 | |
| DATED | : August 11, 2015 | |
| INVENTOR(S) | : Wood et al. | |

It is certified that error appears in the above-identified patent and that said Letters Patent is hereby corrected as shown below:

In the Specification:

Col. 4, line 66 should read:
development system from AccuSoft Corp. of Northborough, In the Claims:

Claim 10, Col. 17, line 23 should read:
tronic objects;

Signed and Sealed this
Third Day of May, 2016

Michelle K. Lee
*Director of the United States Patent and Trademark Office*